United States Patent
Chen et al.

(10) Patent No.: US 10,234,918 B2
(45) Date of Patent: Mar. 19, 2019

(54) DISCONNECTING A BATTERY FROM A SYSTEM

(71) Applicant: HEWLETT-PACKARD DEVELOPMENT COMPANY, L.P., Houston, TX (US)

(72) Inventors: Qijun Chen, Houston, TX (US); Thomas Sawyers, Houston, TX (US); Raghotham Nathadi, Houston, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 15/309,827

(22) PCT Filed: Aug. 29, 2014

(86) PCT No.: PCT/US2014/053519
§ 371 (c)(1),
(2) Date: Nov. 9, 2016

(87) PCT Pub. No.: WO2016/032525
PCT Pub. Date: Mar. 3, 2016

(65) Prior Publication Data
US 2017/0269659 A1 Sep. 21, 2017

(51) Int. Cl.
*G06F 1/26* (2006.01)
*G06F 1/32* (2006.01)
*G06F 1/24* (2006.01)
*H02J 7/00* (2006.01)

(52) U.S. Cl.
CPC ............... *G06F 1/263* (2013.01); *G06F 1/24* (2013.01); *G06F 1/32* (2013.01); *H02J 7/0031* (2013.01)

(58) Field of Classification Search
CPC .................................... G06F 1/26; G06F 1/32
See application file for complete search history.

(56) References Cited

U.S. PATENT DOCUMENTS

| | | | | |
|---|---|---|---|---|
| 5,532,524 A | * | 7/1996 | Townsley | G06F 1/26 307/64 |
| 7,725,137 B2 | * | 5/2010 | Lee | H01M 2/1066 455/343.1 |
| 8,090,961 B2 | | 1/2012 | Yoffe | |
| 8,924,708 B2 | | 12/2014 | Yoffe | |
| 2003/0201755 A1 | | 10/2003 | Briggs et al. | |
| 2004/0132501 A1 | | 7/2004 | Jiang | |

(Continued)

FOREIGN PATENT DOCUMENTS

| | | |
|---|---|---|
| EP | 2634855 A2 | 9/2013 |
| KR | 10-0782271 B1 | 12/2007 |

OTHER PUBLICATIONS

"How Do I Reset the SMC?," 2014, pp. 1-3, Tekserve Corporation, Available at: <faq.tekserve.com/reset-smc/>.

*Primary Examiner* — Phil K Nguyen
(74) *Attorney, Agent, or Firm* — HPI Patent Department

(57) ABSTRACT

In an example implementation, a method of disconnecting a battery from a system, includes detecting that a reset button has been depressed for a preset time period. In response to the detecting, communication lines can be broken between an embedded controller and a system battery, and a command can be sent to the system battery to disconnect itself from the system.

12 Claims, 3 Drawing Sheets

(56) References Cited

U.S. PATENT DOCUMENTS

| | | | |
|---|---|---|---|
| 2005/0009496 A1* | 1/2005 | Chen | G06F 1/3215 455/334 |
| 2006/0077770 A1* | 4/2006 | Abe | G11B 19/044 369/30.01 |
| 2008/0070617 A1 | 3/2008 | Ban | |
| 2009/0256426 A1* | 10/2009 | Vicente | H01H 71/00 307/66 |
| 2011/0133745 A1 | 6/2011 | Nguyen | |
| 2011/0167289 A1 | 7/2011 | Thompson et al. | |
| 2012/0175972 A1* | 7/2012 | Ren | H01M 10/448 307/130 |
| 2012/0293220 A1 | 11/2012 | Li et al. | |
| 2013/0111198 A1 | 5/2013 | Tsutsui | |
| 2013/0162219 A1* | 6/2013 | Huang | H02J 7/0032 320/135 |
| 2017/0149101 A1* | 5/2017 | Sakabe | H01M 10/48 |
| 2017/0288660 A1* | 10/2017 | Bryson | H03K 17/161 |

\* cited by examiner

DISCONNECTING A BATTERY FROM A SYSTEM

BACKGROUND

Recent years have seen an explosion in the use of mobile computing devices such as smartphones, tablets, and notebooks. An ongoing desire for smaller and more light-weight mobile devices has driven research and development in many areas of the system architectures, including the system batteries. Historically, such devices have included detachable battery packs that can be replaced by a user if the battery wears out or stops taking a charge. However, as battery life has continued to improve, the reason for having such replaceable battery packs has been significantly diminished. Continued improvement in battery life has helped to facilitate mobile device designs that are thinner and lighter, and that offer increased run-time. Increasing battery life and the desire for smaller form factors have encouraged a shift to non-removable (i.e., embedded) battery packs. Among other things, embedded battery packs provide product designers with greater flexibility in positioning the battery within the device, which leads to sleeker, more aesthetic designs with smaller form factors.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1:
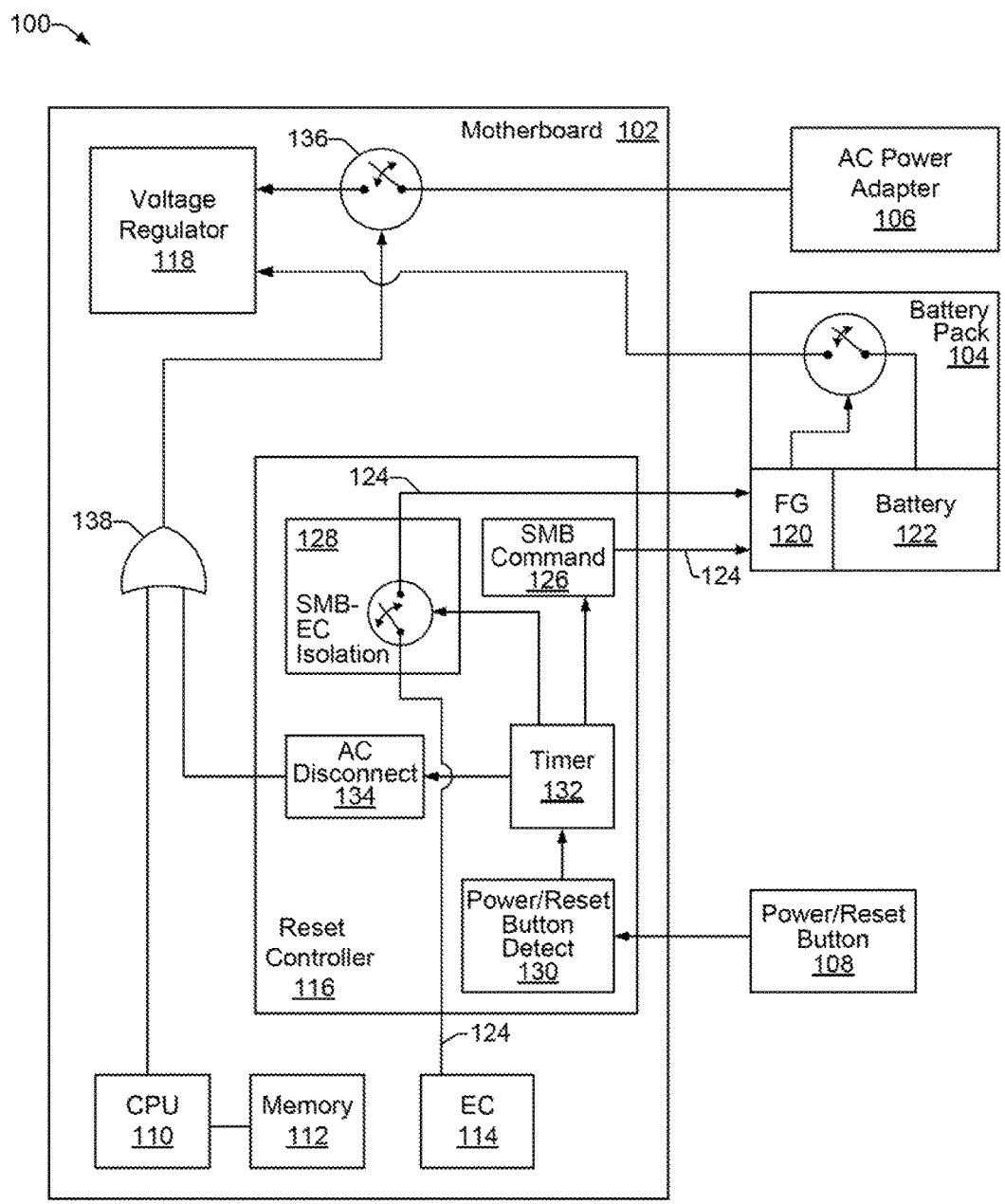
FIG. 1 shows an example of a system such as a system in a notebook computing device suitable for implementing an electrical disconnection of an embedded system battery to reset a locked up system and/or to put the battery into a storage mode.

As noted above, the use of embedded battery packs in mobile devices such as smartphones, tablets, and notebooks, can improve both the performance and the form factors of such devices. Other benefits of embedded battery packs include decreased environmental impact due to less production and disposal of batteries, and improved safety through avoiding aftermarket replacement batteries that are often lower quality and have fewer protection features.

The use of embedded battery packs also has some drawbacks, however. For example, users wanting additional run-time beyond what an embedded battery pack can provide, cannot simply insert a spare battery to continue operating the device. In order to avoid running out of battery power, battery fuel gauges should have improved accuracy and users should pay greater attention to scheduling time for recharging the embedded battery. Another drawback is that a locked up device, or system, can no longer be reset by removing the battery pack. Users have become accustomed to resetting locked up systems by removing the AC adaptor and the battery pack. However, because there is no option to detach the battery in devices with embedded battery packs, more robust systems are being designed having fail-safes to help prevent or recover from system lockups. For example, some devices are designed to reset the system when two or more buttons are pushed down simultaneously, such as the power button and the mute button. While this option works satisfactorily, it involves the user remembering which key or button combination has been assigned for the system reset. In addition, newer device designs have fewer and fewer buttons available to the user and an increasing number of functions to be performed, which can limit the number of different button combinations available for use as the system reset.

Accordingly, example methods and systems disclosed herein enable the disconnection of an embedded system battery in order to reset a locked up system, and/or to put the battery into a storage mode to avoid discharge of the battery. A reset controller provides a number of functions that disengage an embedded controller (EC) from the battery, and command a battery fuel gauge to disconnect the battery from the system. Disengaging the embedded controller is prompted by a reset button detection function of the reset controller that detects when the reset button has been depressed. The reset button detection function triggers a timer function when it detects that the reset button has been depressed, and it continues to monitor the reset button while the timer counts up to a preset time period. If the reset button remains depressed beyond the preset time period, an embedded controller isolation function disconnects an embedded controller from the battery, and a command function sends a command to the battery pack that causes the fuel gauge in the battery pack to disconnect the battery from the system. In some examples, an AC disconnect function also disconnects the AC input to the system. In some examples, the functions of the reset controller can be integrated into a single integrated circuit chip.

In one scenario, when a system locks up, the reset controller detects the reset button being depressed, starts the timer, disconnects the embedded controller, and commands the battery pack to disconnect the battery. In this scenario, the user can thereafter connect the AC adapter and press the power/reset button to reboot the system. In another scenario, a user can leave a device unused for an extended period of time without damaging the health of the battery pack. In general, systems draw small amounts of power even when the system is turned off. In addition, the battery pack has internal components that draw a small amount of power and the battery cells have some amount of self discharge. Therefore when a system is turned off and stored, the battery gets drained until the battery voltage reaches down to an undervoltage protection level. Then the battery pack cuts itself off from the system. Thereafter, the battery pack leakage and self discharge will drain the battery cells further, and when the system is recharged, the battery cells can be damaged. The reset controller described herein gives the user the option of putting the battery into a storage mode to avoid system power drain and extend the storage time before battery fails permanently.

In one described example, a method of disconnecting a battery from a system includes detecting that a reset button has been depressed for a preset time period. Then, in response to the detecting, communication lines are broken (i.e., disconnected) between an embedded controller and a system battery. A command is also sent to the system battery to disconnect itself from the system.

In another example, a system reset control circuit includes a reset button detector to detect and monitor the status of a reset button. The reset control circuit also includes a timer to begin counting time when the reset button is depressed. The reset control circuit includes a bus isolation function to break a connection between an embedded controller and the system battery when the timer reaches a preset time period during which the reset button has remained depressed. The reset control circuit also includes a command function to send an instruction to the battery to disconnect from the system.

In another example, a computing device includes a system to provide power to the device, and a reset controller to disconnect an embedded controller from a battery and to disconnect the battery from the system upon detecting that a reset button has been continually depressed beyond a preset time period.

FIG. 1 shows an example of a system 100 that is suitable for implementing an electrical disconnection of an embedded system battery to reset a locked up system, and/or to put the battery into a storage mode. Example devices that may incorporate such a system 100 include, but are not limited to notebook and laptop computing devices, smartphones, tablets, personal digital assistants (PDAs), retail point of sale devices, wearable computing devices, portable media players, smart televisions, scientific instruments, and so on. The example system 100 includes a motherboard 102, a battery pack 104, an AC adapter 106, and a power/reset button 108. The motherboard 102 includes various electronic components of the system 100, such as the central processing unit (CPU) 110, a memory 112, an embedded controller 114, a reset controller 116, voltage regulators 118, and other components (not shown) such as connectors for peripheral devices (e.g., sound cards, video cards, network cards, hard drives, other persistent storage, TV tuner cards, cards for USB or FireWire slots). CPU 110 can include, for example, one or multiple CPU's on one or multiple integrated circuit chips to execute instructions stored in memory 112 to perform various functions of system 100 through arithmetical, logical, and input/output operations of the system 100. Examples of memory 112 can include both volatile (i.e., RAM) and nonvolatile memory components (e.g., ROM, hard disk, optical disc, CD-ROM, magnetic tape, flash memory, etc.) that comprise non-transitory, machine-readable (e.g., computer/processor-readable) media to provide storage of machine-readable coded program instructions, data structures, program instruction modules, applications, and other data/information executable on CPU 110.

As discussed herein, battery pack 104 comprises an embedded battery pack that is undetachable from system 100. However, battery pack 104 is not limited to being an embedded battery pack, and in some examples it can be a removable, replaceable battery pack. Battery pack 104 comprises a fuel gauge 120 and a system battery 122. Fuel gauge 120 determines the amount of charge remaining in system battery 122 and how much longer the battery can continue to provide power. Fuel gauge 120 also communicates via SMB communication lines 124 with EC 114 and reset controller 116. In one example, fuel gauge 120 receives a command from SMB command 126 on reset controller 116.

Embedded controller (EC) 114 comprises a microcontroller that performs various system tasks not performed by CPU 110, such as receiving and processing signals from a power/reset button 108 and other switches (e.g., a notebook lid switch), turning the system 100 on and off, controlling a cooling fan, managing a battery charger and a battery pack 104, and so on. The EC 114 is on whenever power is supplied to the motherboard 102, and it communicates using the smart management bus (SMB) and SMB protocols. SMB comprises a simple, two-wire/line bus (illustrated as communication line 124) generally used for lightweight power source communications on a motherboard 102. While SMB is discussed herein as the specification used for communication between EC 114, reset controller 116, and battery pack 104, other specifications may also be appropriate, such as the Advanced Configuration and Power Interface (ACPI) specification.

Figure 2:
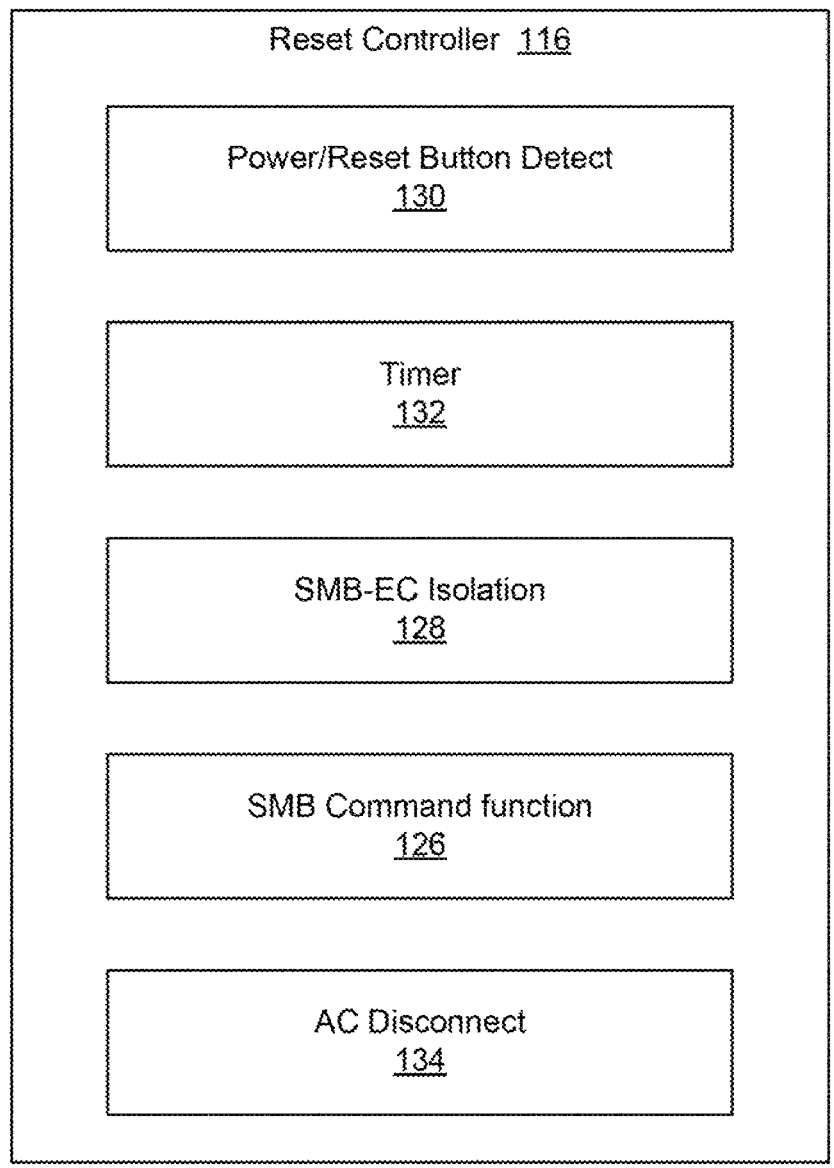
FIG. 2 shows a block diagram of an example reset controller with its integrated functional components.

Reset controller 116 comprises electronic circuitry that includes a number of functional components to facilitate, for example, the disconnection of SMB communication lines 124 between EC 114 and battery pack 104, and the disconnection of the battery 122 from the system 100 (i.e., voltage regulator 118 on motherboard 102). FIG. 2 shows a block diagram of an example reset controller 116 with its integrated functional components. Referring now to both FIG. 1 and FIG. 2, the functional components implemented within reset controller 116 include an 5 MB command component 126, an SMB-EC isolation component 128, a power/reset button detect component 130, a timer 132, and an AC (alternating current) disconnect component 134. While the reset controller 116 is discussed herein as comprising an application specific integrated circuit (ASIC) implementing the various functional components 126, 128, 130, 132, and 134, the reset controller 116 is not limited in this regard, and in some examples it may comprise discrete electronic components for implementing functional components 126, 128, 130, 132, and 134.

The power/reset button detector 130 in reset controller 116 detects and monitors the status of the power/reset button 108. In general, the power/reset button 108 comprises a power button that turns power to the system 100 on and off. However, in other examples, other buttons or keys may be used. Thus, while the examples herein are described with reference to a power/reset button 108, it is to be understood that buttons or keys other than a power button or reset button may be used. Likewise, therefore, the power/reset button detector 130 may be a detector that detects and monitors such other buttons or keys. With this in mind, for the remainder of this description the power/reset button 108 will be primarily referred to as the reset button 108, and the power/reset button detector 130 will be primarily referred to as the reset button detector 130.

The reset button detector 130 in reset controller 116 detects and monitors the status of the reset button 108. More specifically, the reset button detector 130 detects when the reset button 108 is depressed and when it is released. When reset button detector 130 detects that the reset button 108 is depressed, it signals the timer 132 to begin a count. Reset button detector 130 continues to monitor the status of reset button 108 while the timer 132 is counting. If the reset button detector 130 detects that the reset button 108 has been released (i.e., is no longer depressed), then the reset button detector 130 signals the timer 132 to stop the count. However, if the timer 132 reaches a preset time period while the reset button 108 remains depressed, the timer 132 triggers several actions of the reset controller 116. In general, the preset time period is a programmable time period that exceeds the amount of time it takes for the system's operating system to shut down. In one example, the preset time period is 15 seconds.

If the reset button 108 remains depressed beyond the preset time period, the timer 132 provides a signal to the SMB-EC isolation component 128 to open a switch within the SMB-EC isolation component 128 that disconnects, breaks, or otherwise opens the SMB communication line 124 connection between, the EC 114 and the battery pack 104. The switch within the SMB-EC isolation component 128 can comprise, for example, a pair of MOSFET switches for each SMB line 124 broken. The timer 132 also provides a signal to the SMB command function 126 that triggers the SMB command function 126 to send a command to the fuel gauge 120 of the battery pack 104. The command from the SMB command function 126 to the fuel gauge 120 instructs the fuel gauge 120 to disconnect the battery 122 from the system 100. The fuel gauge 120 disconnects the battery 122 from the system 100, for example, by opening up a MOSFET switch within the battery pack 104.

In some examples, the reset controller 116 implements AC disconnect component 134 to disconnect the AC adapter 106 from the system. The AC disconnect component 134 can disconnect or decouple the AC adapter 106 from the system, for example, by opening a switch 136 (e.g., a power MOSFET) on the motherboard 102 between voltage regulators 118 on the motherboard 102 and the AC adapter 106 connected to the motherboard 102. Opening switch 136 can include providing a signal at an input to an OR gate function 138. The OR gate function 138 enables both the system CPU 110 and the AC disconnect component 134 to disconnect the AC adapter 106 from the system. It is noted that in some circumstances, the user may already have disconnected the AC adapter 106 from the system prior to pressing the reset button 108 to reset the system. However, such circumstances are irrelevant to the functioning of the AC disconnect component 134.

Figure 3:
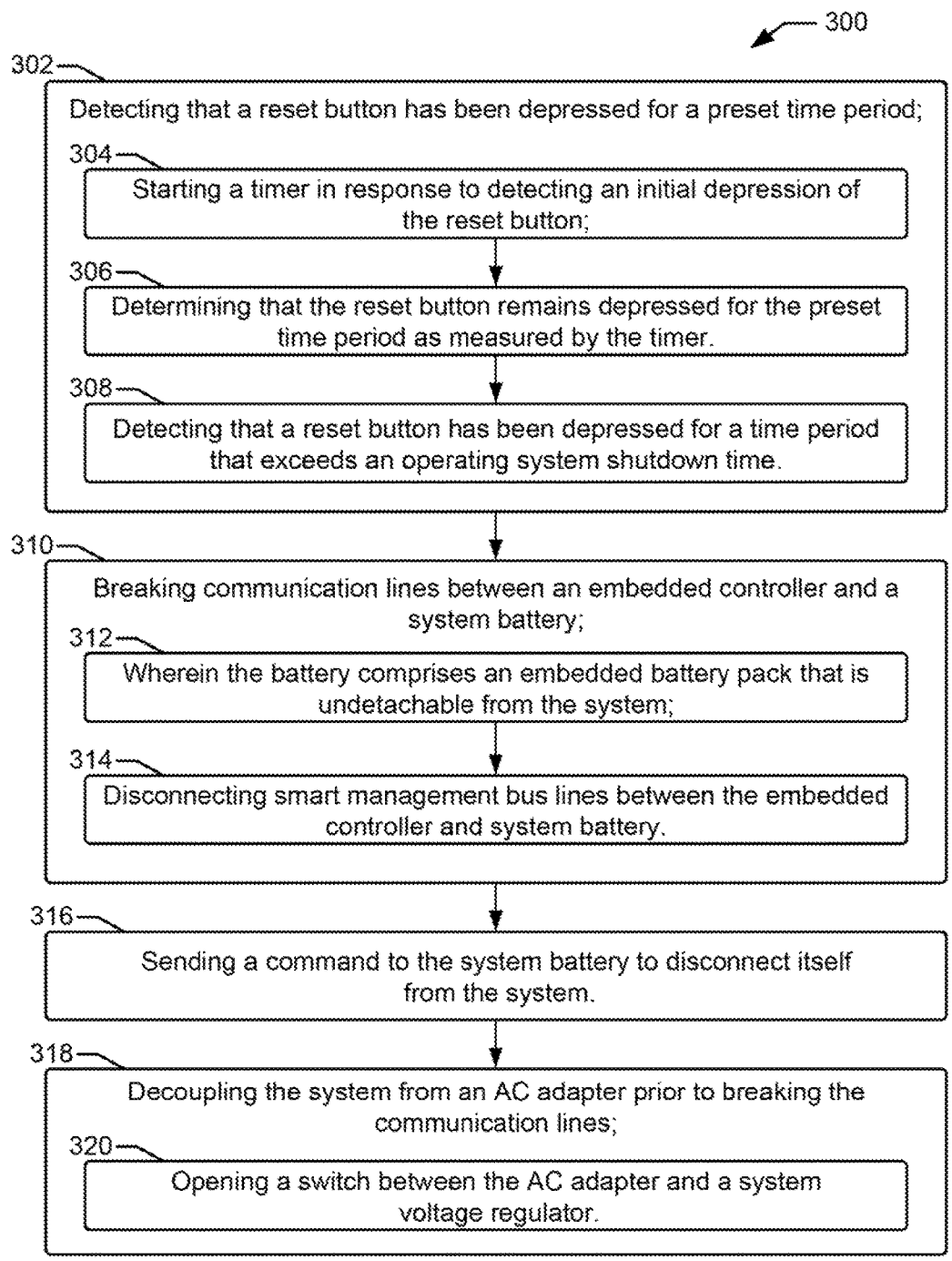
FIG. 3 shows a flow diagram that illustrates an example method of disconnecting a battery from a system such as a system in a notebook computer.

FIG. 3 shows a flow diagram that illustrates an example method 300 of disconnecting a battery from a system 100 such as a system in a notebook computer system. Method 300 is associated with the examples discussed above with regard to FIGS. 1 and 2, and details of the operations shown in method 300 can be found in the related discussion of such examples. The operations of method 300 may be implemented, for example, using an ASIC (application specific integrated circuit) and/or other hardware components alone or in combination with programming instructions executable by a processor such as CPU 110 on a system motherboard 102 of a computing device.

Method 300 may include more than one implementation, and different implementations of method 300 may not employ every operation presented in the flow diagram. Therefore, while the operations of method 300 are presented in a particular order within the flow diagram, the order of their presentation is not intended to be a limitation as to the order in which the operations may actually be implemented, or as to whether all of the operations may be implemented. For example, one implementation of method 300 might be achieved through the performance of a number of initial operations, without performing one or more subsequent operations, while another implementation of method 300 might be achieved through the performance of all of the operations.

Referring now to the flow diagram of FIG. 3, an example method 300 of disconnecting a battery from a system, includes detecting that a reset button has been depressed for a preset time period, as shown at block 302. In some examples, detecting that a reset button has been depressed for a preset time period includes starting a timer in response to detecting an initial depression of the reset button, and determining that the reset button remains depressed for the preset time period as measured by the timer, as shown at blocks 304 and 306, respectively. In other examples, detecting that a reset button has been depressed for a preset time period includes, detecting that a reset button has been depressed for a time period that exceeds an operating system shutdown time, as shown at block 308.

The method 300 can continue at block 310 with breaking communication lines between an embedded controller and a system battery. In some examples, the system battery comprises an embedded battery pack that is undetachable from the system, as shown at block 312. In some examples, breaking communication lines between an embedded controller and a system battery includes disconnecting smart management bus lines between the embedded controller and system battery, as shown at block 314. As shown at block 316, the method includes sending a command to the system battery to disconnect itself from the system. The method can also include decoupling the system from an AC adapter prior to breaking the communication lines as shown at block 318. Decoupling the system from an AC adapter can include opening a switch between the AC adapter and a system voltage regulator, shown at block 320.

What is claimed is:

1. A method of disconnecting a battery from a system, comprising:
   detecting that a reset button has been depressed for a preset time period; and
   in response to the detecting:
   decoupling the system from an alternating current (AC) input;
   after the decoupling of the system, breaking communication lines between an embedded controller and a system battery; and
   separately from the breaking of the communication lines, sending a command to the system battery to disconnect itself from the system,
   wherein decoupling the system from the AC input comprises opening a switch between the AC input and a system voltage regulator.

2. A method as in claim 1, wherein detecting that a reset button has been depressed for a preset time period comprises:
   starting a timer in response to detecting an initial depression of the reset button; and
   determining that the reset button remains depressed for the preset time period as measured by the timer.

3. A method as in claim 1, wherein detecting that a reset button has been depressed for a preset time period comprises detecting that a reset button has been depressed for a time period that exceeds an operating system shutdown time.

4. A method as in claim 1, wherein breaking communication lines between an embedded controller and a system battery comprises disconnecting smart management bus lines between the embedded controller and system battery.

5. A method as in claim 1, wherein the battery comprises an embedded battery pack that is undetachable from the system.

6. A system reset control circuit comprising:
   a reset button detector to detect and monitor the status of a reset button;
   a timer to begin counting time when the reset button is depressed;
   an alternating current (AC) input disconnect function to open a connection between an AC input and a system of the system reset control circuit in response to the timer reaching a preset time period during which the reset button has remained depressed;
   a bus isolation function to break a connection between an embedded controller and a battery when the timer reaches a preset time period during which the reset button has remained depressed, the bus isolation function to break the connection between the embedded controller and the battery after the AC input disconnect function has opened the connection between the AC input and the system; and a command function to send an instruction to the battery to disconnect from the system, wherein the breaking of the connection between the embedded controller and the battery is distinct from the disconnection of the battery from the system, wherein, to open the connection between the AC input and the system, the AC input disconnect function is to open a switch between the AC input and a system voltage regulator.

7. A system reset control circuit as in claim 6, wherein the battery comprises a fuel gauge function to receive the instruction from the command function and to disconnect the battery from the system in response to the command.

8. A system reset control circuit as in claim 6, wherein the battery comprises an embedded battery integrated within the system.

9. A system reset control circuit as in claim 6, wherein the bus isolation function comprises a smart management bus (SMB) isolation circuit that breaks an SMB communication line between the embedded controller and the battery when the timer reaches the preset time period.

10. A computing device comprising:
a system to provide power to the device; and
a reset controller to disconnect an embedded controller from a battery and to disconnect the battery from the system upon detecting that a reset button has been continually depressed beyond a preset time period, wherein the disconnection between the embedded controller and the battery is distinct from the disconnection between the battery and the system, wherein the reset controller comprises an alternating current (AC) disconnection function to disconnect an AC input from the system prior to disconnection of the embedded controller from the battery, the AC disconnection function to open a switch between the AC input and a system voltage regulator to disconnect the AC input from the system.

11. A computing device as in claim 10, wherein the reset controller comprises:
a reset detect function to monitor the status of the reset button; and
a timer to determine when the preset time period has elapsed.

12. A computing device as in claim 10, wherein the reset controller comprises an application specific integrated circuit located along an SMB communication line in between the embedded controller and the battery.

* * * * *